April 8, 1969
C. I. WILLIAMS
3,437,361
SINGLE-WEDGE SPLICING DEVICE
Filed March 1, 1967
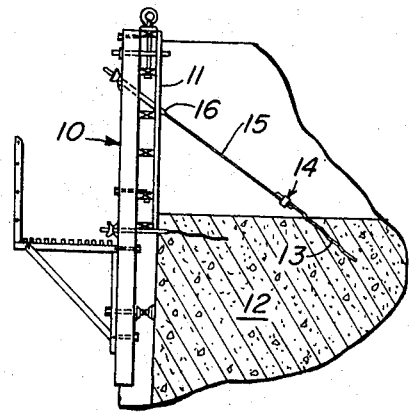
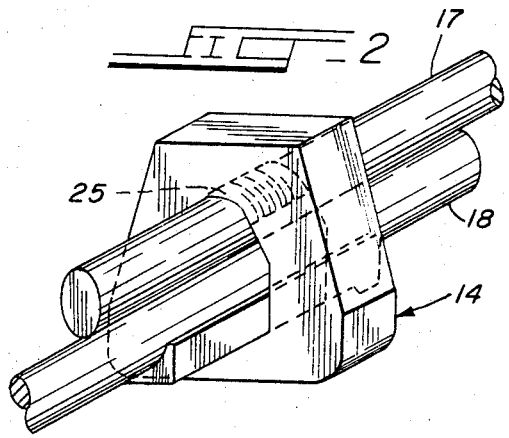
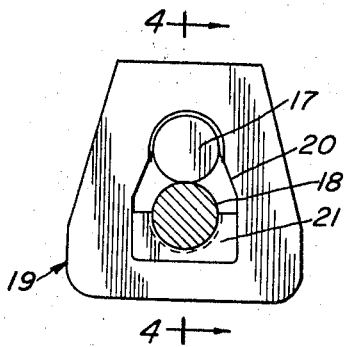
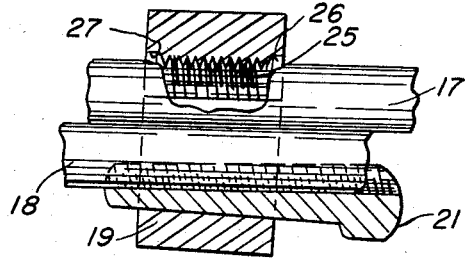
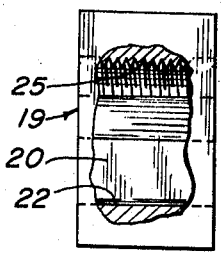
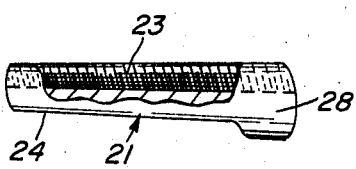
INVENTOR:
CHESTER I. WILLIAMS
BY

United States Patent Office 3,437,361
Patented Apr. 8, 1969

3,437,361
SINGLE-WEDGE SPLICING DEVICE
Chester I. Williams, 347 Greenbriar SE.,
Grand Rapids, Mich. 49506
Filed Mar. 1, 1967, Ser. No. 619,706
Int. Cl. F16b 7/00; E04b 1/58; B25g 3/36
U.S. Cl. 287—104                           3 Claims

ABSTRACT OF THE DISCLOSURE

A splicing device including a block defining an opening for receiving overlapped rods and a wedge, both having corrugations for engaging the rods, the block being adapted for manufacture by parallel machining operations.

SUMMARY OF THE INVENTION

Splicing devices for interconnecting overlapped rods commonly include a block or frame surrounding the rods, and wedges arranged to jam more tightly between the rods and the block as tension is transmitted across the splice. These devices are usable in large numbers, if the cost can be held to a limit figure. The configuration of the wedges has usually resulted in the necessity for (a) producing surfaces on the inside of the block with non-parallel machining operations, or (b) using wedges in pairs. The former alternative becomes particularly troublesome when certain of these surfaces are provided with serrations for biting into the rods to facilitate the jamming action. Applicant has found a way to produce a device utilizing a single wedge, and accommodating the resulting slight tilt of the frame block with respect to the axis of the overlapped rods without sacrificing the jamming action. The serrations on the block are formed, in the preferred form of the invention, as a sector of a system of threads. These are confined to the central portion of the block, so that the pressure generated at this point against the rods is opposite the central area of the support of the wedge by the opposite side of the block. This configuration produces a minimum of slippage, does not overstrain the block, nor does it produce a tendency to unduly cut into the rods as a result of the jamming action. The formation of the serrations by a rotating tap or by a milling cutter is conducted on an axis parallel to the inside surface of the block that receives the wedge. While one of the operations is necessarily rotative, and the other may be a broaching or shearing procedure, the direction of movement of the machines can still be parallel. The phrase "parallel machining operations" is used herein in this sense. It becomes unnecessary to slant the surface supporting the wedge with respect to the axis of the system of serrations. This factor contributes to a reduced cost, as the surrounding block can then be cast, forged or hot-punched, followed by a tapping or milling operation to perform the sector of the system of serrations.

DETAILED DESCRIPTION

The several features of the invention will be analyzed in detail through a discussion of the embodiment illustrated in the accompanying drawing. In the drawing:

FIGURE 1 is a schematic view illustrating a common utility for the device shown in the remaining figures.

FIGURE 2 is a perpsective view on an enlarged scale over that of FIGURE 1, showing the splicing device interconnecting a pair of overlapped rod ends.

FIGURE 3 is a view on a plane normal to the axis of the rods, and illustrating the position of the components of the splicing device.

FIGURE 4 is a section on the plane 4—4 of FIGURE 3.

FIGURE 5 is an exploded view showing the wedge separated from the frame block of the splicing device.

Referring to FIGURE 1, a form structure generally indicated at 10, is shown in position to confine a mass of concrete to the right of the panel 11, which is being deposited on top of the previous pour 12. An anchor 13 is normally imbedded as each pour is made, and a splicing device 14 interconnects the anchor with the extension rod 15 leading to the securing bolt 16. This view illustrates a common use of the splicing unit 14, which has many other fields of utility.

The device 14 is shown in detail in FIGURES 2 through 5. These figures show the device as interconnecting a pair of plain overlapped rod ends 17 and 18. The frame block 19 has a central opening 20 receiving the rod ends 17 and 18, and also receiving the wedge 21. The wedge 21 is slidably received in the block 19 on the surface 22 (note FIGURE 5) and the wedge has a concave serrated surface 23 for engaging the rod end 18. The surface 24 of the wedge rides on the surface 22 of the block 19, which necessarily results in an angularity between the surface 22 and the axis of the serrations 23, due to the taper of the wedge. The corrugations on the wedge may be a section of a thread system, or they may be annular. In either case, it is preferable that they be inclined in the manner of saw teeth to inhibit movement of the wedge to the right with respect to the rod 18, as shown in FIGURE 4.

The inclination referred to above is accommodated in the manner best shown in FIGURE 4. As the device is installed over the rod ends 17 and 18, the wedge 21 is tapped lightly to the left. This produces a tight gripping action between the serartions 23 and the central serrations 25 in the block on the opposite side of the opening 20 from the position of the wedge 21. The serrations 25 are preferably confined to the central area of the block by counter bored areas as shown at 26 and 27, which provide clearance recesses around the upper portion of the rod 17, as shown in FIGURE 4. The pressure from the engagement of the corrugations 25 are thus directed at the central portion of the surface 22 supporting the wedge 21.

Tension applied across the junction of the rods 17 and 18 will tend to produce a clockwise rotation of the block 19 as shown in FIGURE 4, and will also tend to pull the wedge 21 into still tighter engagement. The combination of these actions is sufficiently intense to resist the maximum loading that can be applied to the rods 17 and 18. In a very successful embodiment of the device used to splice ½" rods, the block 19 was made one inch in thickness to the illustrated scale. The counter-bores 26 and 27 were each approximately three-sixteenths of an inch in an axial direction, leaving the central serrated surface 25 about five-eighths of an inch long. The serration at 25 were a sector of a ½"-13 thread system. The block material, of course, should be hardened steel. This arrangement results in an end-for-end symmetry that is very economical to produce. It is preferable to include an enlarged head 28 on the wedge 21 to provide a surface for receiving the blows of a hammer.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. A splicing device for interconnecting parallel overlapped rods, said device including a block having an opening extending therethrough and normally receiving said overlapped rods, and also including wedge means normally interposed between said rods and a portion of said block defining said opening, wherein the improvement comprises a portion on said block defining a sector of a system corrugations extending partially through said block, and defining a part of said opening, said block having a clearance recess opposite at least one end of said system of corrugations limiting the axial length of said system of corrugations to a distance less than the maximum distance from said corrugations across said opening to said wedge means; and said wedge means comprising a wedge member slidable along said opening in linear engagement therewith on the opposite side thereof from said sector, and having a corrugated concave surface facing said sector and unequal in length to said corrugated sector, the difference in length between said corrugated sector and said concave corrugated surface and the relationship between the axial length of said corrugated sector and the distance from said corrugations across said opening to said wedge means cooperating to tilt said block about an axis transverse to said opening upon advancement of said wedge means into said opening to facilitate securement of said rods therein.

2. A device as defined in claim 1, wherein said sector is confined to the central portion of said block, and clearance recesses are provided at the opposite ends of said central portion.

3. A device as defined in claim 1, wherein the axis of said sector is parallel to that surface of said block which receives the said wedge.

References Cited

UNITED STATES PATENTS

| | | | |
|---|---|---|---|
| 2,835,949 | 5/1958 | Wengen | 24—126 |
| 3,079,186 | 2/1963 | Williams | 287—114 |
| 3,170,664 | 2/1965 | Carner | 24—126 |

MARION PARSONS, Jr., *Primary Examiner.*

ANDREW V. KUNDRAT, *Assistant Examiner.*

U.S. Cl. X.R.

24—126; 287—114